(12) United States Patent
Watanabe et al.

(10) Patent No.: US 11,965,733 B2
(45) Date of Patent: Apr. 23, 2024

(54) OPTICAL SENSOR AND GEOMETRY MEASUREMENT APPARATUS

(71) Applicant: Mitutoyo Corporation, Kanagawa (JP)

(72) Inventors: Takamitsu Watanabe, Kanagawa (JP); Kentaro Nemoto, Ibaraki (JP); Yoshihiko Sugita, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 267 days.

(21) Appl. No.: 17/721,858

(22) Filed: Apr. 15, 2022

(65) Prior Publication Data

US 2022/0404142 A1 Dec. 22, 2022

(30) Foreign Application Priority Data

Jun. 16, 2021 (JP) .................................. 2021-100044

(51) Int. Cl.
*G01B 11/24* (2006.01)
(52) U.S. Cl.
CPC .................................. *G01B 11/24* (2013.01)

(58) Field of Classification Search
CPC ............................ G01B 11/24; G01B 11/2518
See application file for complete search history.

(56) References Cited

U.S. PATENT DOCUMENTS

| 2014/0253724 A1 | 9/2014 | Yamagata et al. |
| 2021/0072019 A1* | 3/2021 | Nakano ................ G01B 11/254 |

FOREIGN PATENT DOCUMENTS

JP 2014-174014 9/2014

* cited by examiner

*Primary Examiner* — Hina F Ayub
(74) *Attorney, Agent, or Firm* — Rankin, Hill & Clark LLP

(57) ABSTRACT

An optical sensor includes a radiation part that irradiates an object to be measured with laser light, an imaging part that receives laser light reflected by the object to be measured and captures an image of the object to be measured, a first driving part that moves the radiation part in a radiation direction of laser light to the object to be measured, and a second driving part that moves the imaging part in a reflection direction of laser light from the object to be measured and an orthogonal direction to the reflection direction.

11 Claims, 10 Drawing Sheets

OPTICAL SENSOR AND GEOMETRY MEASUREMENT APPARATUS

CROSS-REFERENCE TO RELATED APPLICATIONS

The present application claims priority to Japanese Patent Applications number 2021-100044, filed on Jun. 16, 2021. The contents of this application are incorporated herein by reference in their entirety.

BACKGROUND OF THE INVENTION

The present disclosure relates to an optical sensor and a geometry measurement apparatus.

In a geometry measurement apparatus, a non-contact type optical sensor for measuring a cross-sectional shape of an object to be measured using a light-section method based on the principle of triangulation is used. The optical sensor irradiates an object to be measured with laser light, and captures an image of the object to be measured on the basis of light reflected by a surface of the object to be measured (see Japanese Unexamined Patent Application Publication No. 2014-174014).

A size and geometry of an object to be measured that is measured by a geometry measurement apparatus may vary. Therefore, conventionally, a plurality of optical sensors (for example, optical sensors with different measurement ranges) are required corresponding to the size and geometry of the object to be measured, and it is necessary to use the optical sensors properly.

BRIEF SUMMARY OF THE INVENTION

The present disclosure focuses on this point, and an object thereof is to accurately measure objects to be measured of various sizes and geometries using a single optical sensor.

A first aspect of the present disclosure provides an optical sensor including a radiation part that irradiates an object to be measured with laser light, an imaging part that receives laser light reflected by the object to be measured and captures an image of the object to be measured, a first driving part that moves the radiation part in a radiation direction of laser light to the object to be measured, and a second driving part that moves the imaging part in a reflection direction of laser light from the object to be measured and an orthogonal direction orthogonal to the reflection direction.

DETAILED DESCRIPTION OF THE INVENTION

<Configuration of Optical Sensor>

A configuration of an optical sensor according to an embodiment will be described with reference to FIGS. 1 to 5.

Figure 1:
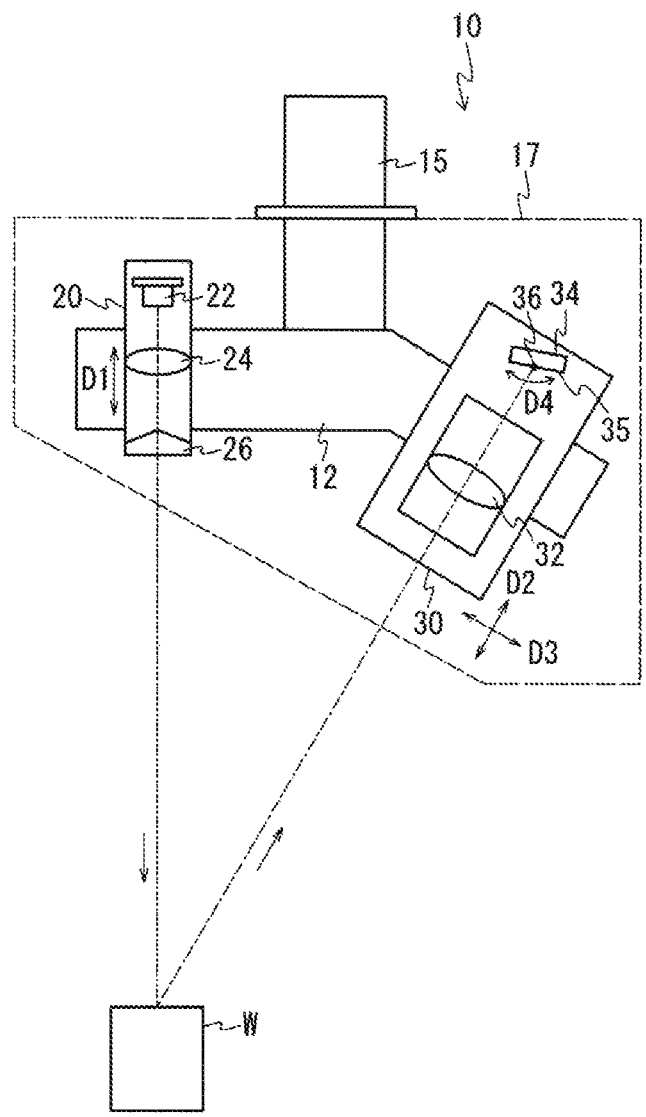
FIG. 1 is a schematic diagram illustrating an internal configuration of an optical sensor 10 according to an embodiment.
Figure 2:
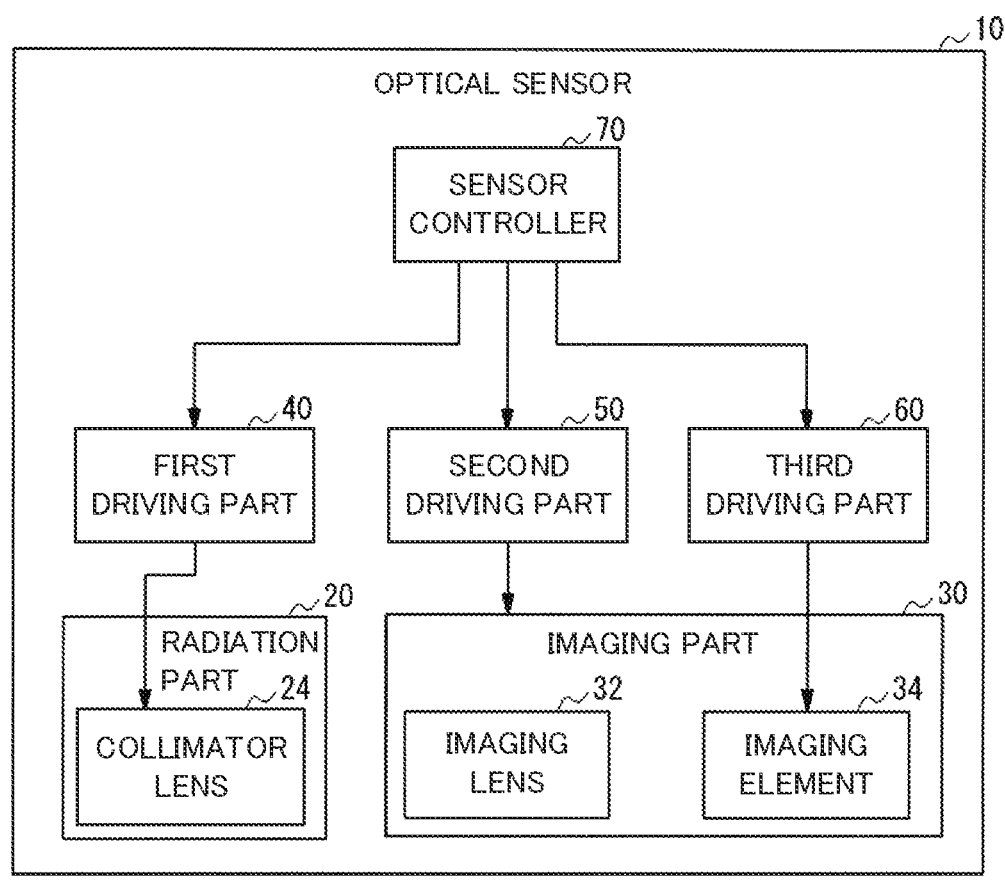
FIG. 2 is a block diagram for explaining a configuration of the optical sensor 10.
Figure 3:
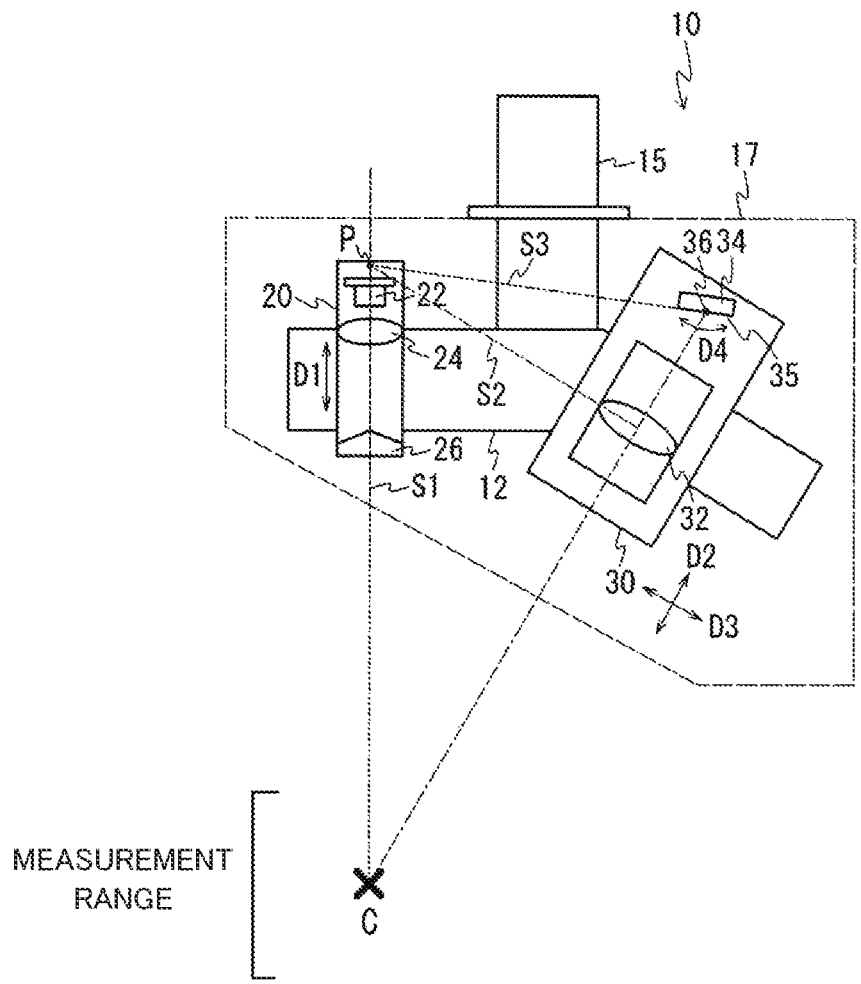
FIG. 3 is a schematic diagram for explaining a relationship between (a) movement positions of a radiation part 20 and an imaging part 30 and (b) a center position of a measurement range.
Figure 4:
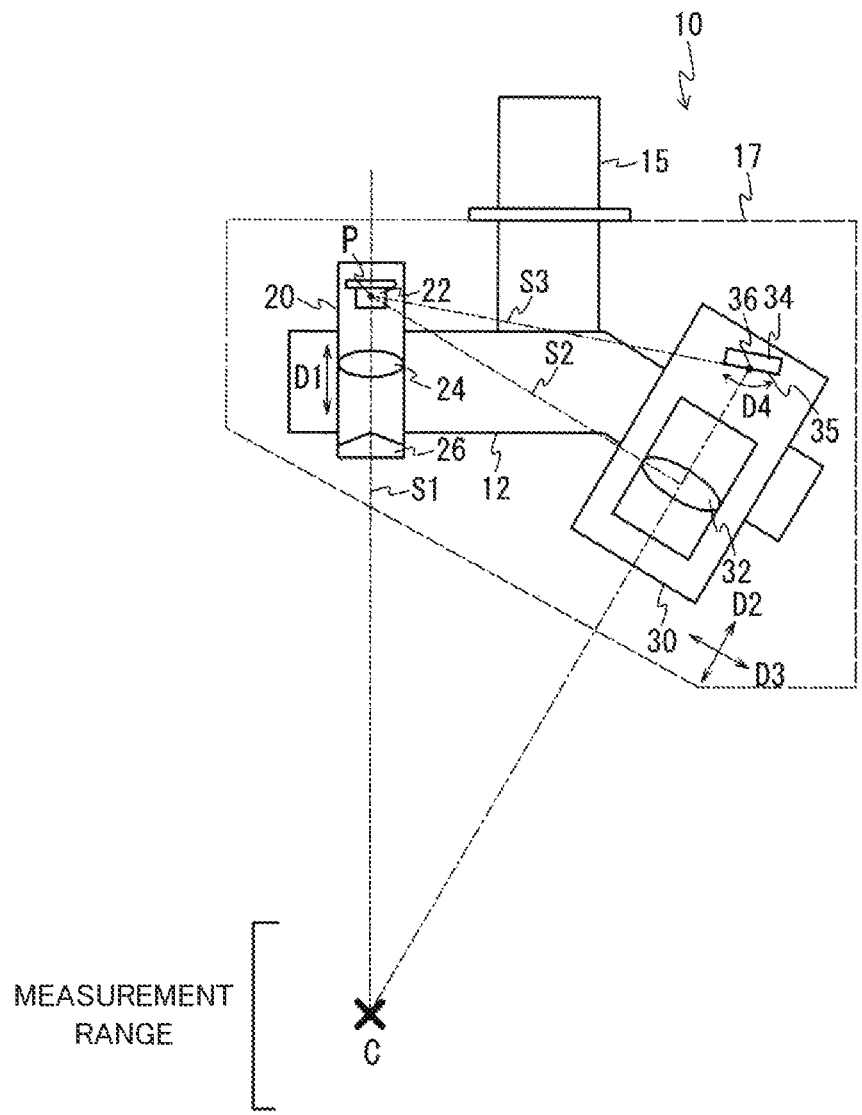
FIG. 4 is a schematic diagram for explaining the relationship between (a) the movement positions of the radiation part 20 and the imaging part 30 and (b) the center position of the measurement range.
Figure 5:
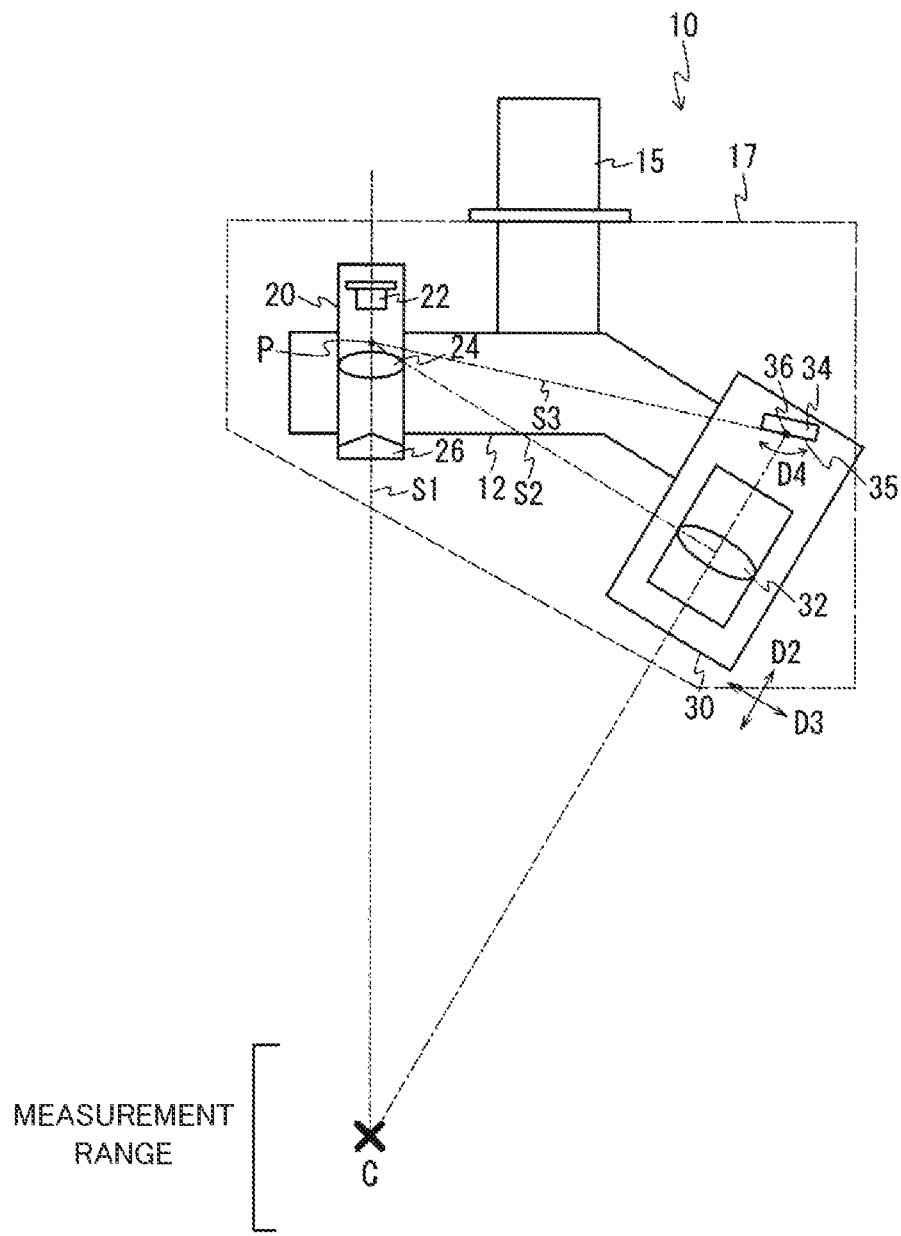
FIG. 5 is a schematic diagram for explaining the relationship between (a) the movement positions of the radiation part 20 and the imaging part 30 and (b) the center position of the measurement range.

FIG. 1 is a schematic diagram illustrating an internal configuration of an optical sensor 10 according to an embodiment. FIG. 2 is a block diagram for explaining a configuration of the optical sensor 10. FIGS. 3 to 5 are schematic diagrams for explaining a relationship between (a) movement positions of a radiation part 20 and an imaging part 30 and (b) a center position of a measurement range. In FIGS. 3 to 5, a center position C of the measurement range of FIG. 3 is closest to the radiation part 20, and the center position C of the measurement range of FIG. 5 is farthest from the radiation part 20.

The optical sensor 10 irradiates an object to be measured W with laser light, and captures an image of the object to be measured W on the basis of light reflected from a surface of the object to be measured W. As shown in FIG. 2, the optical sensor 10 includes the radiation part 20, the imaging part 30, a first driving part 40, a second driving part 50, a third driving part 60, and a sensor controller 70.

As shown in FIG. 1, the radiation part 20 irradiates the object to be measured W with the laser light. The radiation part 20 here radiates the laser light toward the object to be measured located below. As shown in FIG. 1, the radiation part 20 includes a light source 22, a collimator lens 24, and a beam expander 26. For example, the beam expander 26 may be formed by a cylindrical lens.

The light source 22 is formed by, for example, a Laser Diode (LD) or the like, and generates and emits the laser light. The light source 22 emits the laser light of a predetermined wavelength.

The collimator lens 24 collimates the laser light emitted from the light source 22. The collimator lens 24 here is a convex lens.

The beam expander 26 deforms the collimated light (laser light) from the collimator lens 24 into a line-shaped line light.

The imaging part 30 receives the laser light reflected by the object to be measured W, and captures the image of the object to be measured. As shown in FIG. 1, the imaging part 30 is arranged in a direction that makes a predetermined angle with respect to a radiation direction of the light radiated from the radiation part 20 to the object to be measured W, and receives the light reflected by a surface of the object to be measured W from said predetermined angle. As shown in FIG. 1, the imaging part 30 includes an image-forming lens 32 and an imaging element 34.

The image-forming lens 32 forms an image of the laser light reflected from the object to be measured W on an imaging surface 35 of the imaging element 34. The image-forming lens 32 here is a convex lens.

The imaging element 34 is an image sensor that captures the image of the object to be measured W. A CMOS image sensor is used as the image sensor, for example.

In the present embodiment, the radiation part 20 is movable in the radiation direction of the laser light in order to adjust a focus position of the laser light (the center position C of the measurement range). Specifically, the focus position can be adjusted by moving the collimator lens 24 closer to or away from the light source 22 in the radiation direction. The collimator lens 24 translates in a radiation direction D1 shown in FIG. 1.

Further, the imaging part 30 is also movable such that the laser light reflected from the object to be measured W is received at a desired position of the imaging element 34 of the imaging part 30 as the focus position is adjusted. Specifically, the image-forming lens 32 and the imaging element 34 of the imaging part 30 are both movable.

As shown in FIG. 1, the radiation part 20 and the imaging part 30 are movably supported by a supporting body 12 of the optical sensor 10. A mounting part 15 detachably mounted to a body of the geometry measurement apparatus is provided at an upper portion of the supporting body 12. In addition, the supporting body 12, the radiation part 20, and the imaging part 30 are covered with a cover 17.

The first driving part 40 includes a moving mechanism for moving the radiation part 20. The first driving part 40 moves the radiation part 20 in the radiation direction D1 of the laser light to the object to be measured. For example, the first driving part 40 translates the collimator lens 24 of the radiation part 20 in the radiation direction D1. Specifically, the first driving part 40 translates the collimator lens 24 in the radiation direction D1. The first driving part 40 translates the collimator lens 24, for example, within a cylindrical portion of the radiation part 20.

As shown in FIGS. 3 to 5, the first driving part 40 moves the collimator lens 24 to a position away from the light source 22 or moves the collimator lens 24 to a position close to the light source 22, in the radiation direction D1. As shown in FIG. 3, when the collimator lens 24 is positioned closer to the light source 22, the center position C of the measurement range is closer to the radiation part 20. As shown in FIGS. 4 and 5, when the collimator lens 24 is positioned away from the light source 22, the center position C of the measurement range is away from the radiation part 20. By moving the collimator lens 24 in the radiation direction D1 in this way, a measurable range becomes wider without replacing the optical sensor 10.

It should be noted that, in the above description, the first driving part 40 moves the collimator lens 24 in the radiation direction D1, but it is not limited thereto. For example, the first driving part 40 may move the entire radiation part 20 in the radiation direction D1.

The second driving part 50 includes a moving mechanism for moving the imaging part 30. The second driving part 50 moves the imaging part 30 in (i) a reflection direction D2 of the laser light from the object to be measured W and (ii) an orthogonal direction D3 orthogonal to the reflection direction D2. That is, the second driving part 50 moves the imaging element 34 and the image-forming lens 32 of the imaging part 30 in the reflection direction D2 and the orthogonal direction D3. As shown in FIGS. 3 to 5, the second driving part 50 translates the imaging part 30 in the reflection direction D2 and the orthogonal direction D3 in a state where the imaging part 30 is supported by the supporting body 12.

The second driving part 50 moves the imaging part 30 in the reflection direction D2 and the orthogonal direction D3 in conjunction with the movement of the radiation part 20 (specifically, the collimator lens 24) in the radiation direction D1 by the first driving part 40. That is, when the center position C of the measurement range is moved as the radiation part 20 moves, the second driving part 50 moves the imaging part 30 such that the laser light reflected by the object to be measured is received at a desired light receiving position of the imaging part 30. This prevents the accuracy of a measurement result of the imaging part 30 from decreasing even when the radiation part 20 is moved to widen the measurement range using a single optical sensor 10.

When the imaging part 30 moves, a distance between the imaging part 30 and the center position C of the measurement range also changes. For example, the distance between the imaging part 30 and the center position C of the measurement range located at the positions shown in FIG. 5 is longer than the distance between the imaging part 30 and the center position C of the measurement range located at the positions shown in FIG. 3. In other words, the distance between the imaging part 30 and the center position C of the measurement range becomes longer as the center of the measurement range becomes farther from the radiation part 20.

The third driving part 60 includes a rotation mechanism that rotates the imaging element 34 of the imaging part 30. The third driving part 60 rotates the imaging element 34 about a rotation axis 36 extending along a direction orthogonal to the reflection direction D2 and the orthogonal direction D3. The imaging element 34 rotates in a rotation direction D4. When the imaging element 34 is rotated about the rotation shaft 36 in this manner, the imaging element 34 is tilted with respect to the image-forming lens 32.

As shown in FIGS. 3 to 5, the third driving part 60 rotates the imaging element 34 such that a radiation surface of the radiation part 20, a main surface of the image-forming lens 32, and the imaging surface 35 of the imaging element 34 satisfies the condition of the Scheimpflug principle. Here, the Scheimpflug principle refers to a case where an extension plane S1 of the radiation surface of the radiation part 20, an extension plane S2 of the main surface of the image-forming lens 32, and an extension plane S3 of the imaging surface of the imaging element 34 intersect at a point P. As described above, when the condition of the Scheimpflug principle is satisfied, the imaging surface 35 of the imaging element 34 is in a focused state.

The third driving part 60 rotates the imaging element 34 when the first driving part 40 moves the radiation part 20 and the second driving part 50 moves the imaging part 30. That is, the third driving part 60 rotates the imaging element 34 about the rotation shaft 36 in the rotation direction D4 with respect to the radiation part 20 and the imaging part 30 after the movement to satisfy the condition of the Scheimpflug principle. In particular, the distance between the imaging element 34 and the center position C of the measurement range changes when the radiation part 20 and the imaging part 30 move, but it is possible to focus both the object to be measured at a position farther from the imaging element 34 and the object to be measured at a position closer to the imaging element 34 by rotating the imaging element 34 so as to satisfy the condition of the Scheimpflug principle.

The sensor controller 70 controls an operation of the optical sensor 10. The sensor controller 70 controls radiation of the laser light by the radiation part 20 and imaging of the image of the object to be measured W by the imaging part 30. The sensor controller 70 operates the first driving part 40, the second driving part 50, and the third driving part 60. That is, the sensor controller 70 operates the first driving part 40 to move the radiation part 20 in the radiation direction D1, operates the second driving part 50 to move the imaging part 30 in the reflection direction D2 and the orthogonal direction D3, and operates the third driving part 60 to rotate the imaging element 34 in the rotation direction D4.

The sensor controller 70 adjusts the center position C of the measurement range suitable for the object to be measured before measuring the object to be measured W. That is, before measuring the object to be measured W, the sensor controller 70 causes the first driving part 40 to move the radiation part 20 in the radiation direction D1 and causes the second driving part 50 to move the imaging part 30 in the reflection direction D2 and the orthogonal direction D3, thereby adjusting the center position C of the measurement range.

At this time, the sensor controller 70 moves the radiation part 20 and the imaging part 30 as described below. That is, the sensor controller 70 moves the imaging part 30 in the orthogonal direction D3 such that the laser light reflected from the object to be measured W is received at the center of the imaging surface 35 of the imaging part 30. In addition, the sensor controller 70 moves the radiation part 20 in the radiation direction D and moves the imaging part 30 in the reflection direction D2 such that a difference in brightness and darkness between a light-receiving portion that receives the laser light and other portions of the imaging surface 35 is maximized (in other words, such that the contrast value is maximized). This makes it easier to identify the geometry of the object to be measured W because the peak of the light intensity of the laser light received at the center of the imaging surface 35 is high.

After the sensor controller 70 adjusts the positions of the radiation part 20 and the imaging part 30, the sensor controller 70 rotates the imaging element 34 so as to satisfy the condition of the Scheimpflug principle. That is, the sensor controller 70 rotates the imaging element 34, on the basis of the positions of the radiation part 20 and the imaging part 30 after the movement, such that the radiation surface of the radiation part 20, the main surface of the image-forming lens 32, and the imaging surface of the imaging element 34 satisfy the condition of the Scheimpflug principle. This prevents the measurement accuracy from decreasing even if the center position C of the measurement range is moved according to the object to be measured.

(Configuration of Geometry Measurement Apparatus)

A configuration of a geometry measurement apparatus 1 including the optical sensor 10 having the above-described configuration will be described with reference to FIG. 6.

Figure 6:
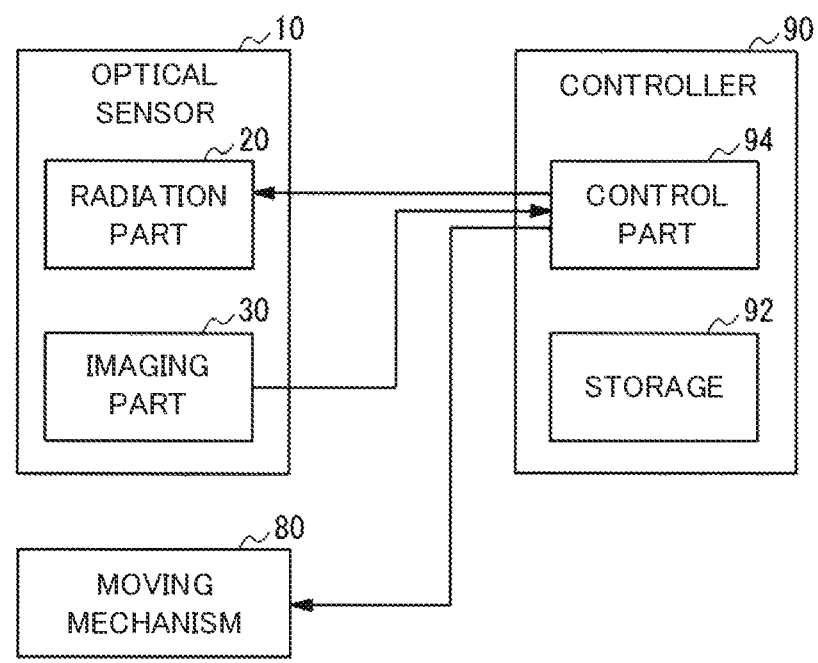
FIG. 6 is a schematic diagram for explaining a configuration of a geometry measurement apparatus 1.

FIG. 6 is a schematic diagram for explaining the configuration of the geometry measurement apparatus 1. The geometry measurement apparatus 1 measures the geometry of the object to be measured W on the basis of the measurement result of the imaging part 30 of the optical sensor 10. The geometry measurement apparatus 1 is a coordinate measurement apparatus that measures the geometry of a workpiece, for example. As shown in FIG. 6, the geometry measurement apparatus 1 includes the optical sensor 10, a moving mechanism 80, and a controller 90.

Since the configuration of the optical sensor 10 is as shown in FIG. 2, a detailed description thereof will be omitted here. In FIG. 6, the configuration of the optical sensor 10 is simplified for convenience of description. The moving mechanism 80 moves the optical sensor 10. For example, the moving mechanism 80 moves the optical sensor 10 in three axial directions orthogonal to each other.

The controller 90 controls the operation of the optical sensor 10 (specifically, the radiation part 20 and the imaging part 30) and the moving mechanism 80. Further, the controller 90 performs measurement with the optical sensor 10 while moving the optical sensor 10 with the moving mechanism 80, for example. The controller 90 includes a storage 92 and a control part 94.

The storage 92 includes a Read Only Memory (ROM) and a Random Access Memory (RAM), for example. The storage 92 stores various pieces of data and a program executable by the control part 94. For example, the storage 92 stores the result measured by the optical sensor 10.

The control part 94 is a Central Processing Unit (CPU), for example. The control part 94 controls the operation of the optical sensor 10 via the sensor controller 70 by executing the program stored in the storage 92. Specifically, the control part 94 controls the radiation of the laser light to the object to be measured W by the light source 22 of the radiation part 20. Further, the control part 94 acquires an output of the imaging part 30 and calculates the geometry of the object to be measured W. In the present embodiment, the control part 94 functions as a calculation part that calculates the geometry of the object to be measured W on the basis of the output of the imaging part 30.

<Position Adjustment Process of Radiation Part and Imaging Part>

A position adjustment process of the radiation part 20 and the imaging part 30 will be described with reference to FIG. 7.

Figure 7:
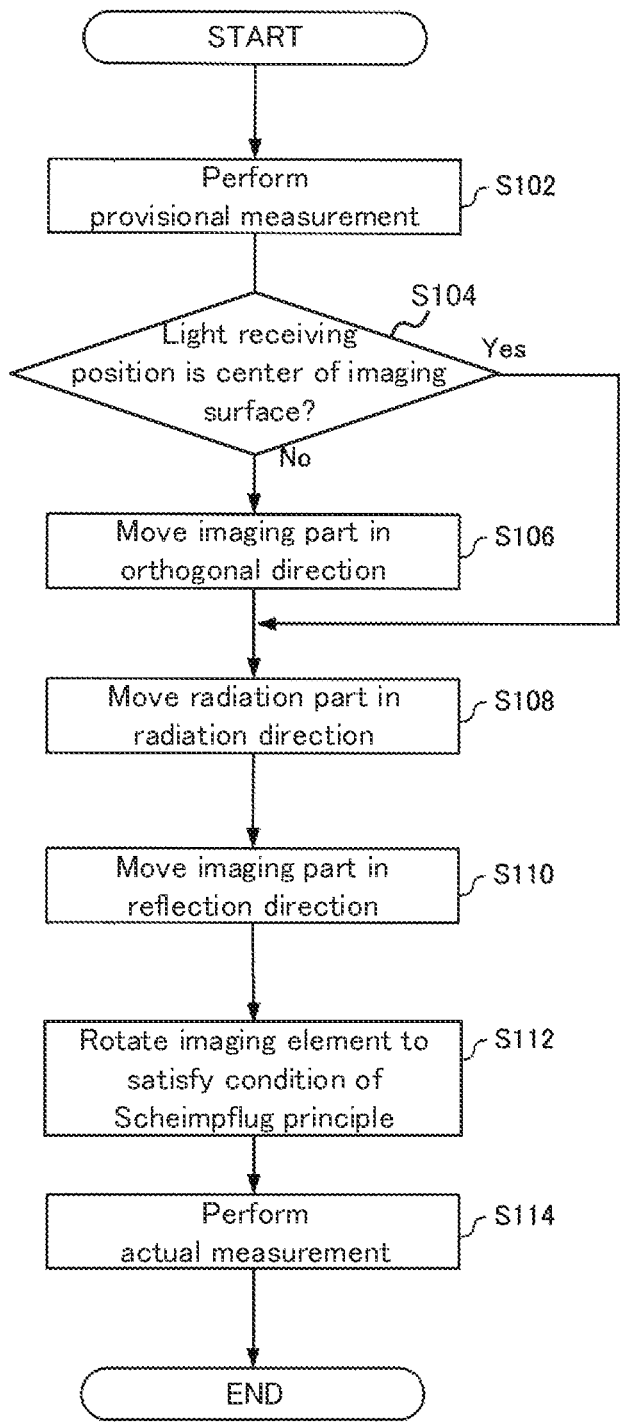
FIG. 7 is a flowchart for explaining an example of a position adjustment process of the radiation part 20 and the imaging part 30.

FIG. 7 is a flowchart for explaining an example of the position adjustment process of the radiation part 20 and the imaging part 30. The flowchart of FIG. 7 is started when, for example, the object to be measured W is placed on the geometry measurement apparatus 1 and an instruction to start measurement is received.

First, the sensor controller 70 performs provisional measurement of the object to be measured W for adjusting a position before performing an actual measurement of the object to be measured W (step S102). The sensor controller 70 causes the radiation part 20 to irradiate the object to be measured W with the laser light, and causes the imaging part 30 to receive the laser light reflected by the object to be measured W to capture the image of the object to be measured W. Here, it is assumed that the measurement result shown in FIG. 8 is obtained as a result of the provisional measurement.

Figure 8:
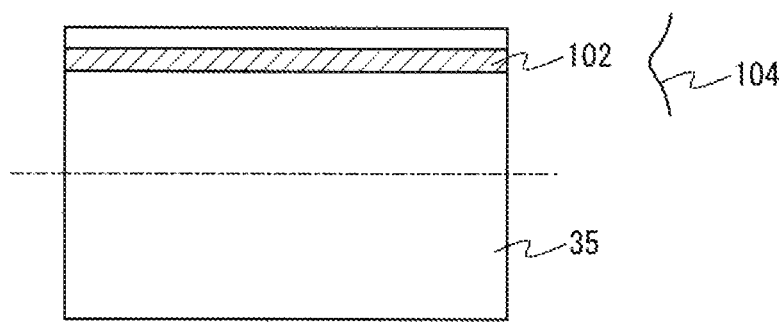
FIG. 8 is a schematic diagram for explaining an example of a measurement result of a provisional measurement.

FIG. 8 is a schematic diagram for explaining an example of the measurement result of the provisional measurement. As can be seen from FIG. 8, an image 102 corresponding to the received laser light is located around one end instead of the center of the imaging surface 35 of the imaging part 30. Further, FIG. 8 also shows a cross-sectional profile 104 of the image 102 and the light intensity in the periphery.

Next, the sensor controller 70 determines whether or not a light receiving position (in other words, the image 102) on the imaging element 34 that receives the laser light in the provisional measurement is located at the center of the imaging surface 35 of the imaging element 34 (step S104). As shown in FIG. 8, if the image 102 is not located at the center of the imaging surface 35 (step S104: NO), the sensor controller 70 causes the second driving part 50 to operate the imaging part 30 to move the imaging part 30 in the orthogonal direction D3 such that the image 102 is located at the center of the imaging surface 35 (step S106). That is, the second driving part 50 translates the image-forming lens 32 and the imaging element 34 of the imaging part 30 in the orthogonal direction D3. If the image 102 is located at the center of the imaging surface 35 (step S104: YES), the sensor controller 70 omits the process of step S106.

Figure 9A:
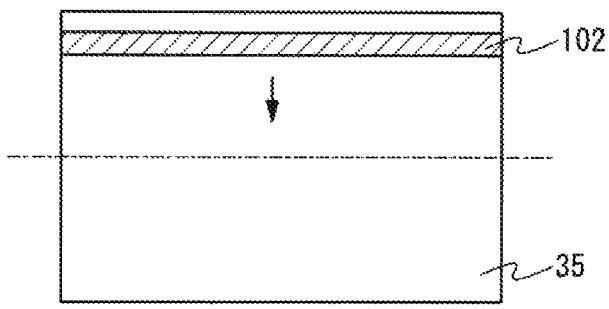
FIGS. 9A to 9C are schematic diagrams for explaining an adjustment of an image 102 on an imaging surface 35.
Figure 9B:
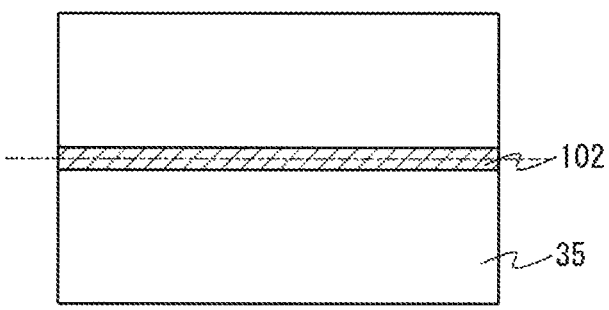
Figure 9C:
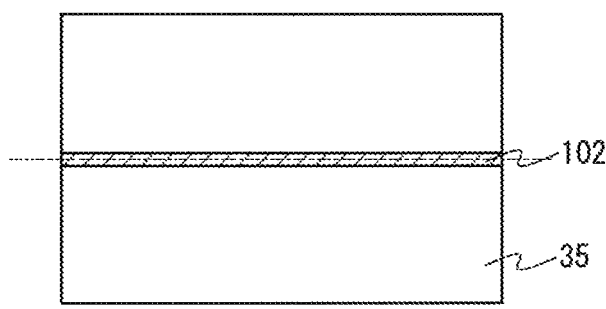
Figure 10A:
FIGS. 10A to 10C are schematic diagrams for explaining a change in a cross-sectional profile 104 of light intensity.
Figure 10B:
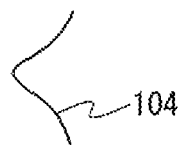
Figure 10C:

FIGS. 9A to 9C are schematic diagrams for explaining an adjustment of the image 102 on the imaging surface 35. FIGS. 10A to 10C are schematic diagrams for explaining a change in the cross-sectional profile 104 of the light intensity. When the imaging part 30 moves in the orthogonal direction D3, the image 102 moves in the direction of the arrow shown in FIG. 9A, and is positioned at the center of the imaging surface 35 as shown in FIG. 9B. The cross-sectional profile 104 when the image 102 is located at the center of the imaging surface 35 is as shown in FIG. 10A, and is the same as FIG. 8.

Next, the sensor controller 70 causes the first driving part 40 to move the radiation part 20 in the radiation direction D1 so as to increase the contrast value on the imaging surface 35 (step S108). That is, the first driving part 40 translates the collimator lens 24 of the radiation part 20 in the radiation direction D1. As a result, as shown in FIG. 10B, the peak portion of the light intensity of the image 102 increases, and the difference in brightness and darkness between the image 102 and the other portions increases.

Next, the sensor controller 70 causes the second driving part 50 to move the imaging part 30 in the reflection direction D2 so as to maximize the contrast value (step S110). That is, the second driving part 50 translates the image-forming lens 32 and the imaging element 34 of the imaging part 30 in the reflection direction D2. As a result, the image 102 is narrowed as shown in FIG. 9C, while the peak portion of the cross-sectional profile of the light intensity becomes higher as shown in FIG. 10C.

Next, the sensor controller 70 causes the third driving part 60 to operate to rotate the imaging element 34 with respect to the radiation part 20 and the imaging part 30 after the movement, to satisfy the condition of the Scheimpflug principle (step S112). That is, the third driving part 60 rotates the imaging element 34 about the rotation shaft 36 in the rotation direction D4.

When the position adjustments of the radiation part 20 and the imaging part 30 on the basis of the provisional measurement are completed, the sensor controller 70 performs the actual measurement of the object to be measured W (step S114). Thus, it is possible to adjust the positions of the radiation part 20 and the imaging part 30 to be suitable for measuring the object to be measured W without replacing the optical sensor 10, such that the object to be measured W can be measured with high accuracy.

<Effect of Present Embodiment>

The optical sensor 10 of the above-described embodiment includes (a) a first driving part 40 that moves the radiation part 20 in the radiation direction D1 of the laser light to the object to be measured W and (b) a second driving part 50 that moves the imaging part 30 in the reflection direction D2 and the orthogonal direction D3 of the laser light.

With a configuration in which the radiation part 20 and the imaging part 30 are moved in this way, it is possible to adjust the positions of the radiation part 20 and the imaging part 30 to be suitable for the geometry and size of the object to be measured W without replacing the optical sensor 10 before the measurement of the object to be measured W. For example, it is possible to adjust the center position (focus position) of the measurement range to a position to be suitable for the geometry and size of the object to be measured W (see FIGS. 3 to 5). As a result, a single optical sensor 10 can measure a large area.

Further, the optical sensor 10 includes a third driving part 60 that rotates the imaging element 34 of the imaging part 30 so as to satisfy the condition of the Scheimpflug principle. Thus, even when the radiation part 20 and the imaging part 30 move, the imaging element 34 is rotated to satisfy the condition of the Scheimpflug principle. As a result, the measurement accuracy can be prevented from being decreased due to the movements of the radiation part 20 and the imaging part 30.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. An optical sensor comprising:
   a radiation part that irradiates an object to be measured with laser light;
   an imaging part that receives laser light reflected by the object to be measured and captures an image of the object to be measured;
   a first driving part that moves the radiation part in a radiation direction of laser light to the object to be measured; and
   a second driving part that moves the imaging part in a reflection direction of laser light from the object to be measured and an orthogonal direction orthogonal to the reflection direction.

2. The optical sensor according to claim 1, wherein
   the radiation part includes a light source that emits laser light and a collimator lens that collimates the laser light emitted from the light source, and
   the first driving part translates the collimator lens in the radiation direction with respect to the light source.

3. The optical sensor according to claim 1, wherein
   the imaging part includes an imaging element that captures the image of the object to be measured, and an image-forming lens that forms an image of laser light reflected from the object to be measured on the imaging element, and
   the second driving part moves the imaging element and the image-forming lens in the reflection direction and the orthogonal direction.

4. The optical sensor according to claim 3, further comprising:
   a third driving part that rotates the imaging element such that a radiation surface of the radiation part, a main surface of the image-forming lens, and an imaging surface of the imaging element satisfy a condition of the Scheimpflug principle.

5. The optical sensor according to claim 4, wherein
   the third driving part rotates the imaging element about a rotation axis extending along a direction orthogonal to the reflection direction and the orthogonal direction.

6. The optical sensor according to claim 5, wherein
   the rotation axis is located at a position intersecting the optical axis of the image-forming lens.

7. The optical sensor according to claim 1, further comprising:
a controller that adjusts, before measuring the object to be measured, a center position of a measurement range by causing the first driving part to move the radiation part in the radiation direction and causing the second driving part to move the imaging part in the reflection direction and the orthogonal direction.

8. The optical sensor according to claim 7, wherein
the controller moves the imaging part in the orthogonal direction such that the laser light reflected from the object to be measured is received at the center of the imaging surface of the imaging part.

9. The optical sensor according to claim 8, wherein
the controller moves the radiation part in the radiation direction and moves the imaging part in the reflection direction such that a difference in brightness and darkness between a light-receiving portion that receives the laser light and other portions of the imaging surface is maximized.

10. The optical sensor according to claim 9, wherein
the imaging part includes an imaging element that captures the image of the object to be measured, and an image-forming lens that forms the image of the laser light reflected from the object to be measured on the imaging element, and
the controller rotates the imaging element on the basis of the movement positions of the radiation part and the imaging part such that the radiation surface of the radiation part, the main surface of the image-forming lens, and the imaging surface of the imaging element satisfy the condition of the Scheimpflug principle.

11. A geometry measurement apparatus comprising:
an optical sensor that includes
a radiation part that irradiates an object to be measured with laser light,
an imaging part that receives laser light reflected by the object to be measured and captures an image of the object to be measured,
a first driving part that moves the radiation part in a radiation direction of laser light to the object to be measured, and
a second driving part that moves the imaging part in a reflection direction of laser light from the object to be measured and an orthogonal direction orthogonal to the reflection direction; and
a calculation part that calculates a geometry of the object to be measured on the basis of an output of the imaging part.

* * * * *